(12) United States Patent
Mizutani

(10) Patent No.: US 8,160,882 B2
(45) Date of Patent: Apr. 17, 2012

(54) SPEECH INFORMATION PROCESSING APPARATUS AND METHOD

(75) Inventor: Nobuaki Mizutani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 597 days.

(21) Appl. No.: 12/358,660

(22) Filed: Jan. 23, 2009

(65) Prior Publication Data

US 2009/0187408 A1 Jul. 23, 2009

(30) Foreign Application Priority Data

Jan. 23, 2008 (JP) .................................. 2008-012800

(51) Int. Cl.
*G10L 13/06* (2006.01)
(52) U.S. Cl. ...................................................... 704/266
(58) Field of Classification Search .................. 704/266
See application file for complete search history.

(56) References Cited

U.S. PATENT DOCUMENTS

| | | | |
|---|---|---|---|
| 7,006,881 B1 * | 2/2006 | Hoffberg et al. ................ 700/83 |
| 7,392,185 B2 * | 6/2008 | Bennett .......................... 704/243 |
| 7,624,007 B2 * | 11/2009 | Bennett .............................. 704/9 |
| 7,647,225 B2 * | 1/2010 | Bennett et al. ................ 704/251 |
| 7,672,841 B2 * | 3/2010 | Bennett ......................... 704/215 |

FOREIGN PATENT DOCUMENTS

JP 2004-206144 7/2004

* cited by examiner

*Primary Examiner* — Michael N Opsasnick
(74) *Attorney, Agent, or Firm* — Oblon, Spivak, McClelland, Maier & Neustadt, L.L.P.

(57) ABSTRACT

A temporary child set is generated. An elastic ratio of an elastic section of a model pattern is calculated. A temporary typical pattern of the set is generated by combining the pattern belonging to the set with the model pattern having the elastic pattern expanded or contracted. A distortion between the temporary typical pattern of the set and the pattern belonging to the set is calculated, and a child set is determined as the set when the distortion is below a threshold. A typical pattern as the temporary typical pattern of the child set is stored with a classification rule as the classification item of the context of the pattern belonging to the child set.

14 Claims, 12 Drawing Sheets

| ACCENT TYPE | NUMBER OF MORAS | HEAD BOUNDARY POSE | PART OF SPEECH | MODIFIED PHASE | EMPHASIS | ... | PRECEDING ACCENT TYPE | ... | NUMBER OF SUCCEEDING MORAS | FUNDAMENTAL FREQUENCY PATTERN |
|---|---|---|---|---|---|---|---|---|---|---|
| 1 | 4 | NON | NOUN | SECOND SUCCEEDING PHASE | NON | ... | – | ... | 5 | 1 ⌒ |
| 0 | 5 | EXISTENCE | ADJECTIVE | SUCCEEDING PHASE | EXISTENCE | ... | 1 | ... | 8 | 2 ⌒ |
| 3 | 8 | NON | NOUN ⊕ ADJECTIVE | NON | NON | ... | 0 | ... | – | 3 ⌒ |
| 0 | 3 | EXISTENCE | ADJECTIVE | SUCCEEDING PHASE | NON | ... | – | ... | 4 | 4 ⌒ |
| 1 | 4 | NON | NOUN | SECOND SUCCEEDING PHASE | NON | ... | 0 | ... | 10 | 5 ⌒ |
| ... | ... | ... | ... | ... | ... | | ... | | ... | ... |

SPEECH INFORMATION PROCESSING APPARATUS AND METHOD

CROSS-REFERENCE TO RELATED APPLICATIONS

This application is based upon and claims the benefit of priority from Japanese Patent Application No. 2008-012800, filed on Jan. 23, 2008; the entire contents of which are incorporated herein by reference.

FIELD OF THE INVENTION

The present invention relates to an apparatus for processing speech information and a method for processing speech information.

BACKGROUND OF THE INVENTION

Recently, a text-to-speech synthesis system to artificially generate a speech signal from an arbitrary sentence is developed. In general, the text-to-speech synthesis system is composed of a language processing unit, a prosody generation unit, and a speech signal generation unit.

In component of the text-to-speech synthesis system, ability of the prosody generation unit relates with naturalness of synthesized speech. Especially, a fundamental frequency pattern (a change pattern of loudness of a voice) has large influence on naturalness of synthesized speech.

With regard to a conventional method for generating a fundamental frequency pattern for text speech synthesis, the fundamental frequency pattern is generated using relatively a simple model. As a result, a synthesized speech having unnatural intonation is mechanically generated.

In order to solve above-problem, for example, another method for generating a fundamental frequency pattern is disclosed in JP-A No. 2007-33870 (KOKAI). In this method, a large number of fundamental frequency patterns (extracted from a natural speech) are hierarchically clustered. By subjecting a statistic processing to each cluster (a set of fundamental frequency pattern), a typical pattern is generated for each cluster.

However, a set of fundamental frequency pattern at a lower layer is necessarily small because of hierarchical clustering. Accordingly, statistical reliability of the typical pattern is low, and robustability and naturalness drop. In order to generate a fundamental frequency pattern having naturalness, the set of fundamental frequency pattern at each lower layer must be maintained as a predetermined scale, and all types of fundamental frequency patterns must be prepared. In other words, a large number of speech data must be previously prepared.

SUMMARY OF THE INVENTION

The present invention is directed to an apparatus for processing speech information and a method for generating a typical pattern used for speech processing with robustability and naturalness.

According to an aspect of the present invention, there is provided an apparatus for processing speech information, comprising: a first generation unit configured to generate a temporary child set to which at least one fundamental frequency pattern belongs by classifying a plurality of fundamental frequency patterns of inputted speech data based on a classification item of a context of the inputted speech data; a first decision unit configured to decide a length of a temporary typical pattern of the temporary child set; a model pattern setting unit configured to set a model pattern having an elastic section along a temporal direction; a calculation unit configured to calculate an elastic ratio of the elastic section so that the length of the temporal typical pattern coincides with a length of the model pattern; an elastic unit configured to expand or contract the elastic section of the model pattern based on the elastic ratio; a second generation unit configured to generate the temporary typical pattern of the temporary child set by combining the fundamental frequency pattern belonging to the temporary child set with the model pattern having an elastic pattern expanded or contracted; a second decision unit configured to calculate a distortion between the temporary typical pattern of the temporary child set and the fundamental frequency pattern belonging to the temporary child set, and to decide a child set as the temporary child set when the distortion is below a threshold; a pattern storage unit configured to store a typical pattern as the temporary typical pattern of the child set; and a rule storage unit configured to store a classification rule of the typical pattern as the classification item of the context of the fundamental frequency pattern belonging to the child set.

According to another aspect of the present invention, there is also provided a method for processing speech information, comprising: generating a temporary child set to which at least one fundamental frequency pattern belongs by classifying a plurality of fundamental frequency patterns of inputted speech data based on a classification item of a context of the inputted speech data; deciding a length of a temporary typical pattern of the temporary child set; setting a model pattern having an elastic section along a temporal direction; calculating an elastic ratio of the elastic section so that the length of the temporal typical pattern coincides with a length of the model pattern; expanding or contracting the elastic section of the model pattern based on the elastic ratio; generating the temporary typical pattern of the temporary child set by combining the fundamental frequency pattern belonging to the temporary child set with the model pattern having an elastic pattern expanded or contracted; calculating a distortion between the temporary typical pattern of the temporary child set and the fundamental frequency pattern belonging to the temporary child set; deciding a child set as the temporary child set when the distortion is below a threshold; storing a typical pattern as the temporary typical pattern of the child set; and storing a classification rule of the typical pattern as the classification item of the context of the fundamental frequency pattern belonging to the child set.

According to still another aspect of the present invention, there is also provided a computer program stored in a computer readable medium for causing a computer to perform a method for processing speech information, the method comprising: generating a temporary child set to which at least one fundamental frequency pattern belongs by classifying a plurality of fundamental frequency patterns of inputted speech data based on a classification item of a context of the inputted speech data; deciding a length of a temporary typical pattern of the temporary child set; setting a model pattern having an elastic section along a temporal direction; calculating an elastic ratio of the elastic section so that the length of the temporal typical pattern coincides with a length of the model pattern; expanding or contracting the elastic section of the model pattern based on the elastic ratio; generating the temporary typical pattern of the temporary child set by combining the fundamental frequency pattern belonging to the temporary child set with the model pattern having an elastic pattern expanded or contracted; calculating a distortion between the temporary typical pattern of the temporary child set and the fundamental frequency pattern belonging to the temporary child set; deciding a child set as the temporary child set when the distortion is below a threshold; storing a typical pattern as the temporary typical pattern of the child set; and storing a classification rule of the typical pattern as the classification item of the context of the fundamental frequency pattern belonging to the child set.

BRIEF DESCRIPTION OF THE DRAWINGS

FIG. 3 is a schematic diagram of exemplary speech data.

FIGS. 7A and 7B are schematic diagrams of an exemplary correspondence relationship between a fundamental frequency pattern and a normalized fundamental frequency pattern.

DETAILED DESCRIPTION OF THE EMBODIMENTS

Figure 1:
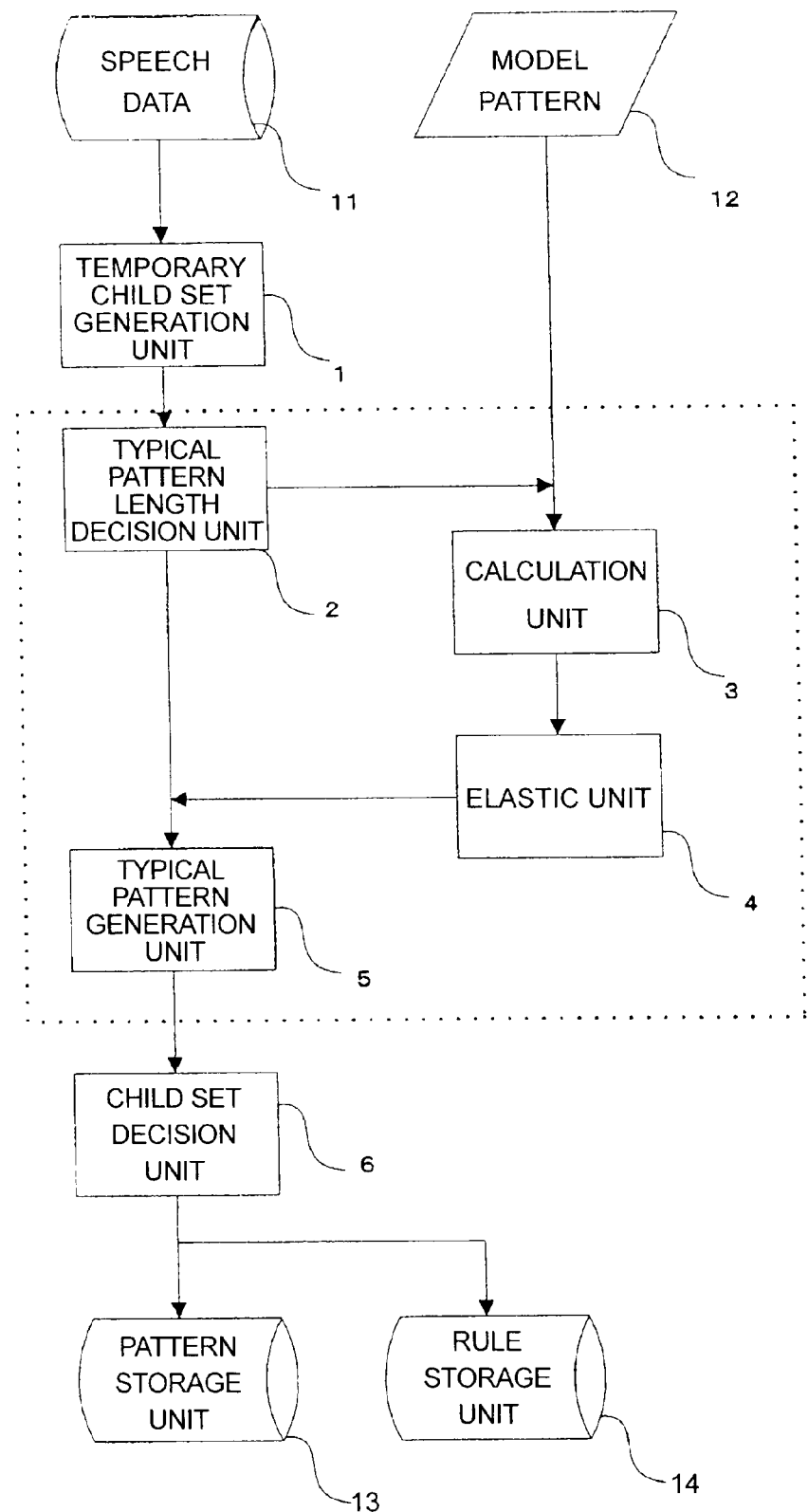
FIG. 1 is a block diagram of a typical pattern training apparatus according to a first embodiment.

Hereinafter, embodiments of the present invention will be explained by referring to the drawings. The present invention is not limited to the following embodiments.

The first embodiment includes a pattern training apparatus as a speech information processing apparatus. The second embodiment includes a pattern output apparatus using the pattern training apparatus of the first embodiment.

The First Embodiment

Hereinafter, a typical pattern training apparatus of the first embodiment is explained by referring to FIGS. 1-15.

First, component of the typical pattern learning apparatus is explained by referring to FIG. 1. FIG. 1 is a block diagram of the typical pattern training apparatus.

The typical pattern training apparatus includes a temporary child set generation unit 1, a typical pattern length decision unit 2, a calculation unit 3, an elastic unit 4, a typical pattern generation unit 5, a child set decision unit 6, a pattern storage unit 13, and a rule (for selecting typical pattern) storage unit 14.

In this explanation, "typical pattern" is a normalized pattern of a fundamental frequency pattern (synthesized speech parameter) used for text-to-speech synthesis, and "prosodic control unit" is a unit to control a prosodic feature of speech corresponding to an input context.

With regard to speech data 11 (for training) including fundamental frequency patterns (each corresponding to a prosodic control unit) and a context of each fundamental frequency pattern, the temporary child set generation unit 1 classifies the fundamental frequency patterns based on the context into a plurality of temporary child sets.

The typical pattern length decision unit 2 determines a length of a temporary typical pattern belonging to each temporary child set. A model pattern 12 is a typical pattern already prepared as the prosodic control unit and includes an elastic section to match with the length of the temporary typical pattern. The calculation unit 3 calculates an elastic ratio of the elastic section based on the model pattern 12 and the length of the temporary typical pattern. The elastic unit 4 expands or contracts the elastic section of the model pattern based on the elastic ratio.

The typical pattern generation unit 5 generates a temporary typical pattern having the determined length by statistic processing of each temporary child set using the model pattern having the elastic section expanded or contracted. The child set decision unit 6 determines a child set by calculating a distortion between the temporary typical pattern and the fundamental frequency pattern for each temporary child set. The pattern storage unit 13 stores a typical pattern as the temporary typical pattern belonging to the child set. The rule storage unit 14 stores a classification rule based on the context of the child set.

Figure 2:
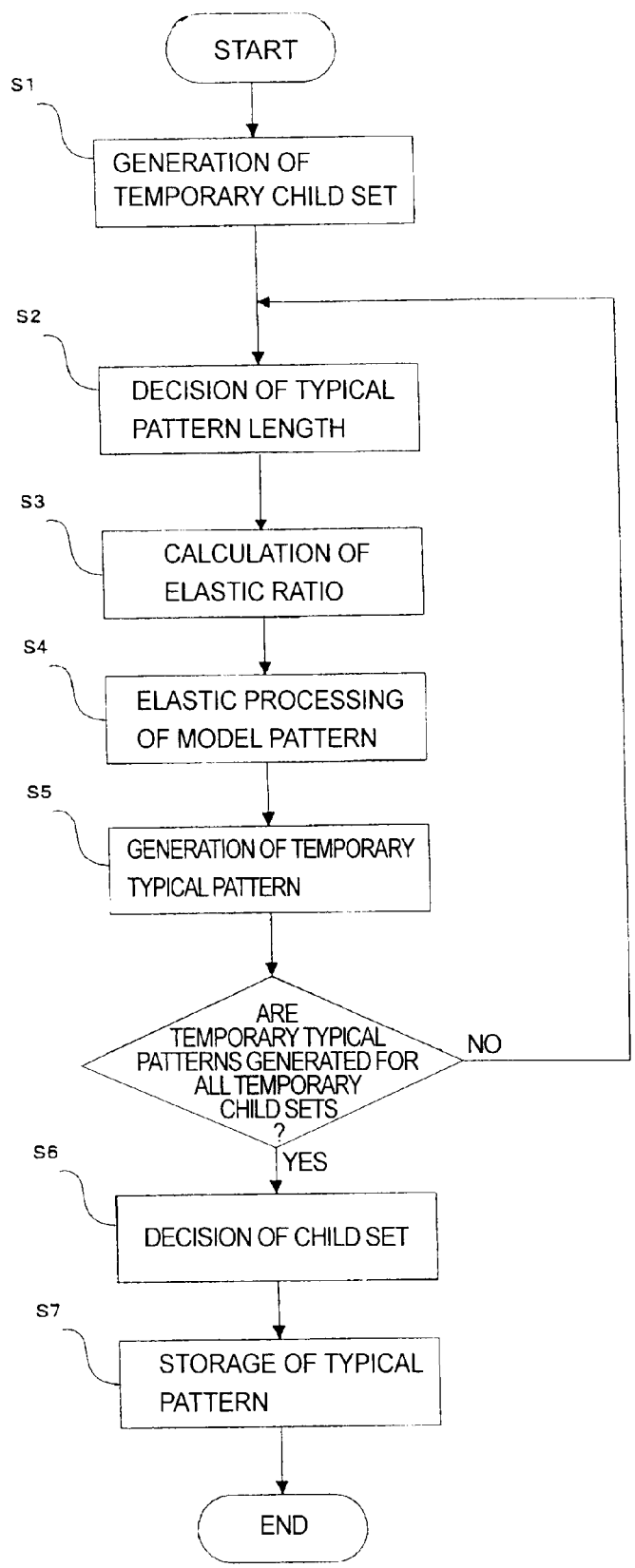
FIG. 2 is a flow chart of processing of the typical pattern training apparatus in FIG. 1.

Next, operation of the typical pattern training apparatus is explained by referring to FIG. 2. FIG. 2 is a flow chart of processing of the typical pattern training apparatus.

First, an exemplary input speech data 11 for training is shown in FIG. 3. The speech data 11 includes a fundamental frequency pattern of each accent phase (as one of speech pattern sequence extracted from speech database) and a context corresponding to the accent phase.

In FIG. 3, an identifier (1, 2, 3, . . . ) at the left side of each fundamental frequency pattern is a pattern identification number for explanation. By using the pattern identification number, a context corresponding to the fundamental frequency pattern can be inferred. However, the pattern identification number is not always prepared in the speech data 11.

In the first embodiment, the prosodic control unit is an accent phase. As a classification item of the context, an accent type of the accent phase, the number of moras in the accent phase, a pose at a head boundary of the accent phase, a part of speech, a modified phase, whether an emphasis exists in the accent phase, an accent type of a preceding accent phase, and the number of moras in a succeeding accent phase.

With regard to a set of fundamental frequency patterns (each corresponding to an accent phase) in the speech data 11, the temporary child set generation unit 1 classifies the set into a plurality of temporary child sets, based on the classification item of the context of each accent phase (S1).

Figure 4:
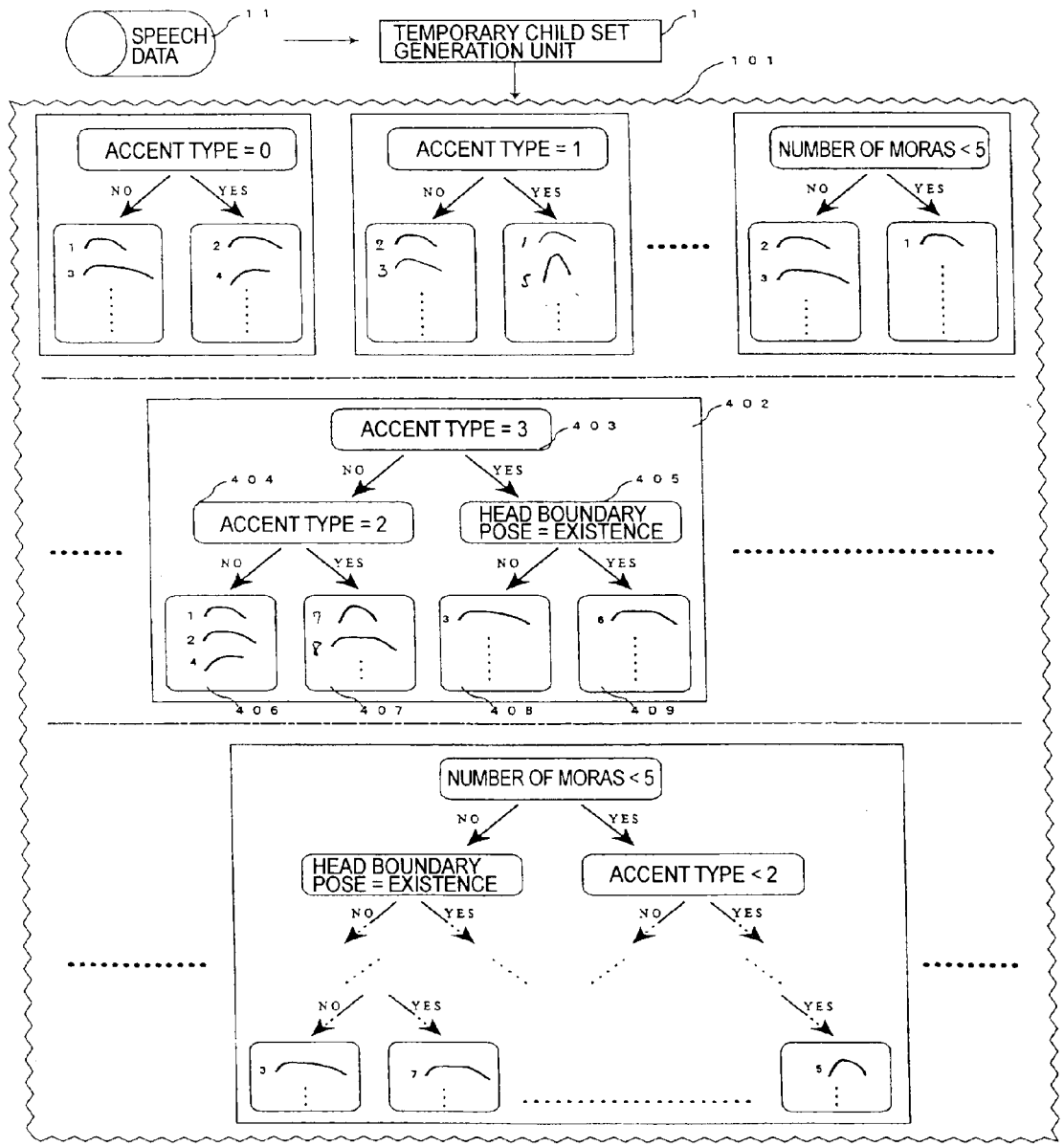
FIG. 4 is a schematic diagram of temporary child sets classified by a temporary child set generation unit in FIG. 1.

FIG. 4 is a plurality of exemplary temporary child sets 402 generated by the temporary child set generation unit 1. Generation processing of the temporary child set 402 is explained in detail. As shown in FIG. 4, the temporary child set 402 includes sub-classification rules 403, 404, 405 related with context of the fundamental frequency patterns.

Next, speech data 11 (as a set of fundamental frequency pattern) is input, and the set is classified. For example, with regard to a fundamental frequency pattern 1 having "accent type=1, the number of moras=4, a head boundary pose of prosody control unit=non" in FIG. 3, a sub-classification rule 403 "accent type=3" is not matched, and "NO" path from the sub-classification rule 403 is tracked. Second, a sub-classification rule 404 "accent type=2" is not matched, and "NO" path from the sub-classification rule 404 is tracked. As a result, the fundamental frequency pattern 1 is an element of a fundamental frequency pattern-child set 406.

As mentioned-above, the temporary child set 402 consists of the sub-classification rules 403, 404, 405, and fundamental frequency pattern-child sets 406, 407, 408, 409.

A temporary classification rule can be automatically generated by combination of sub-classification rules related with a value range of the context. For example, the sub-classification rule is "accent type=1", "accent type<2", "the number of moras=3", "the number of moras<4", "head boundary pose=existence", "part of speech=noun", "modified phase>1", "accent type of preceding accent phase>0", "the number of moras of succeeding phase=4".

With regard to the temporary classification rule, combination of the sub-classification rules may be limited using knowledge such as phonetics or phonology. For example, by using knowledge "If each fundamental frequency pattern corresponds to an accent phase, a plurality of fundamental frequency patterns having different accent type cannot belong to the same classification.", the sub-classification rule related with accent type is preferentially utilized.

Furthermore, the sub-classification rule which is called "a query" may be used as one temporary classification rule. In FIG. 4, by each sub-classification rule, the fundamental frequency pattern (from input path) is classified into any of two output paths "YES" and "NO". However, another sub-classification rule to classify into any of at least three output paths may be used.

Next, the typical pattern length decision unit 2 determines a length of temporary typical pattern to be generated for each temporary child set (S2). With regard to the temporary typical pattern, one mora is represented by three points. In case that a maximum length of fundamental frequency patterns (the number of moras) in the child set is "$L_{pmax}$", a length "$L_c$" of temporary typical pattern is "$3 \times L_{pmax}$". Furthermore, "$L_c = 3 \times L_{pave}$" may be used as the length of temporary typical pattern by an average length "$L_{pave}$" of fundamental frequency patterns (the number of moras) in the child set.

With regard to a model pattern e (a typical pattern of the prosodic control unit) having an elastic pattern to match with a length of the temporary typical pattern, the calculation unit 3 calculates an elastic ratio Φ of the elastic pattern from the model pattern e and a temporary typical pattern determined by the typical pattern length decision unit 2.

The model pattern is determined by a parent set and an ancestor set of the temporary typical pattern included in the temporary child set. With regard to a temporary child set 402 in FIG. 4, a parent set of the fundamental frequency pattern-child set 407 (classified with the classification rule) corresponds to a position of sub-classification rule 404 as a set of one upper layer. A model pattern of a fundamental frequency pattern-child set 404 is a temporary typical pattern (generated by the typical pattern generation unit 5) from fundamental frequency patterns of the fundamental frequency pattern-child sets 406 and 407 (classified with the classification rule). In the same way, a model pattern is determined for fundamental frequency pattern-child sets 406, 408, and 409. If a parent set and an ancestor set of the temporary typical pattern do not exist, the model pattern is regarded as one vector having each element "0".

Figure 5:
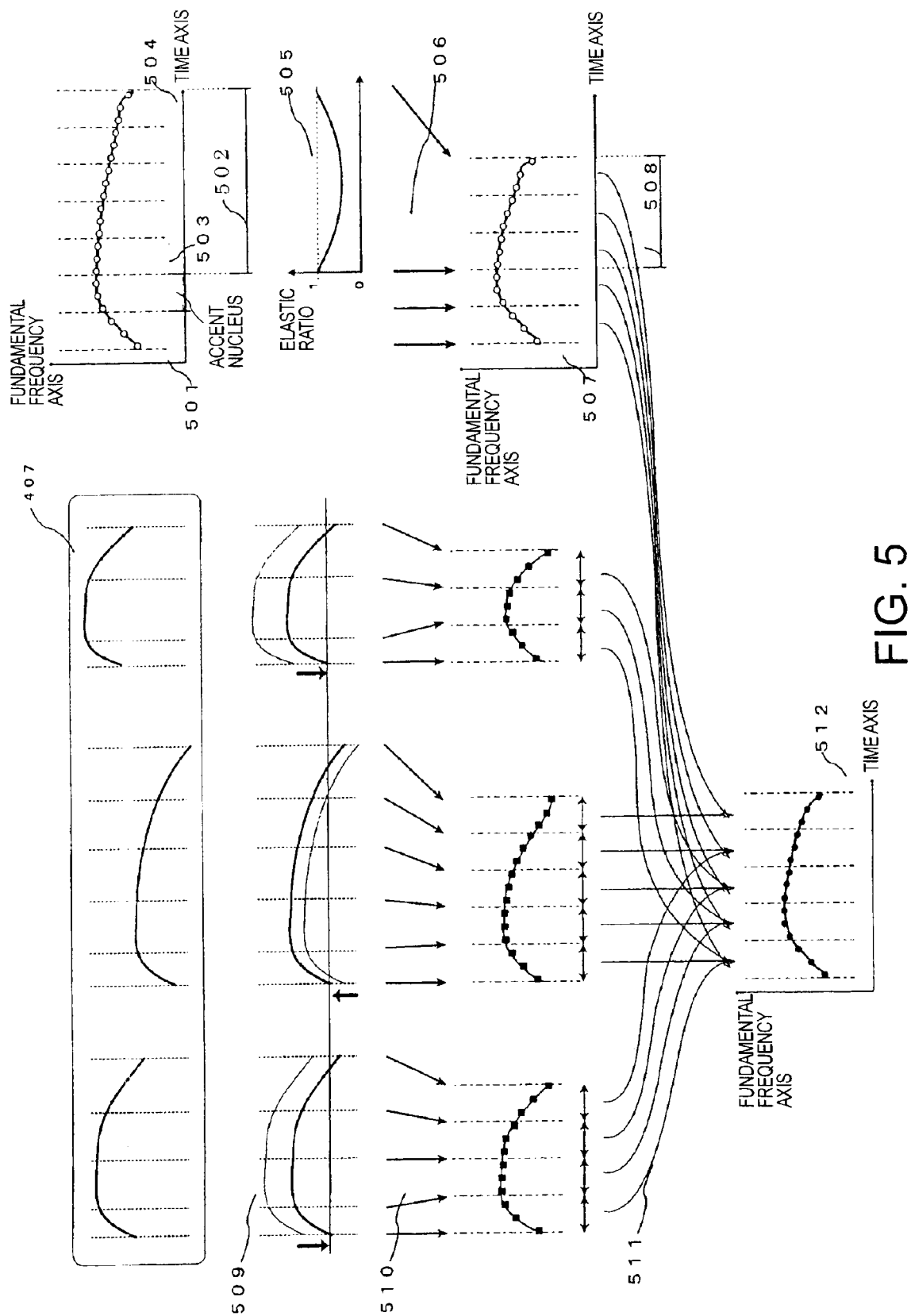
FIG. 5 is a schematic diagram of generation of a temporary typical pattern by statistic processing.

The right side of FIG. 5 is an exemplary operation of the calculation unit 3. The elastic ratio is calculated so that a length of the model pattern coincides with a length of the temporary typical pattern ($L_c$=15). A sign 505 represents the elastic ratio of the elastic section.

In FIG. 5, a model pattern 501 has an elastic section 502 to vary a length of the model pattern 501. The elastic section 502 represents a temporal length between a phoneme 503 of succeeding accent nucleus and an end phoneme 504 of an accent phase. The phoneme 503 is a next mora of an accent nucleus along time axis, and the end phoneme 504 is an end mora of the model pattern 501 along the time axis.

In this example, the model pattern 501 is a typical model pattern of type-2 accent phase averaged from other speech data including a large number of fundamental frequency patterns. A length "$L_d$" of model pattern is "21", and a length of the elastic section "$L_e$" is "15".

The elastic ratio of the elastic section is calculated as follows. First, a length of the elastic section in the model pattern is Y(=$L_e$=15), and a length of section between a mora of succeeding accent nucleus and an end mora of accent phase in the temporary typical pattern is X(=$L_e$=9).

Figure 6:
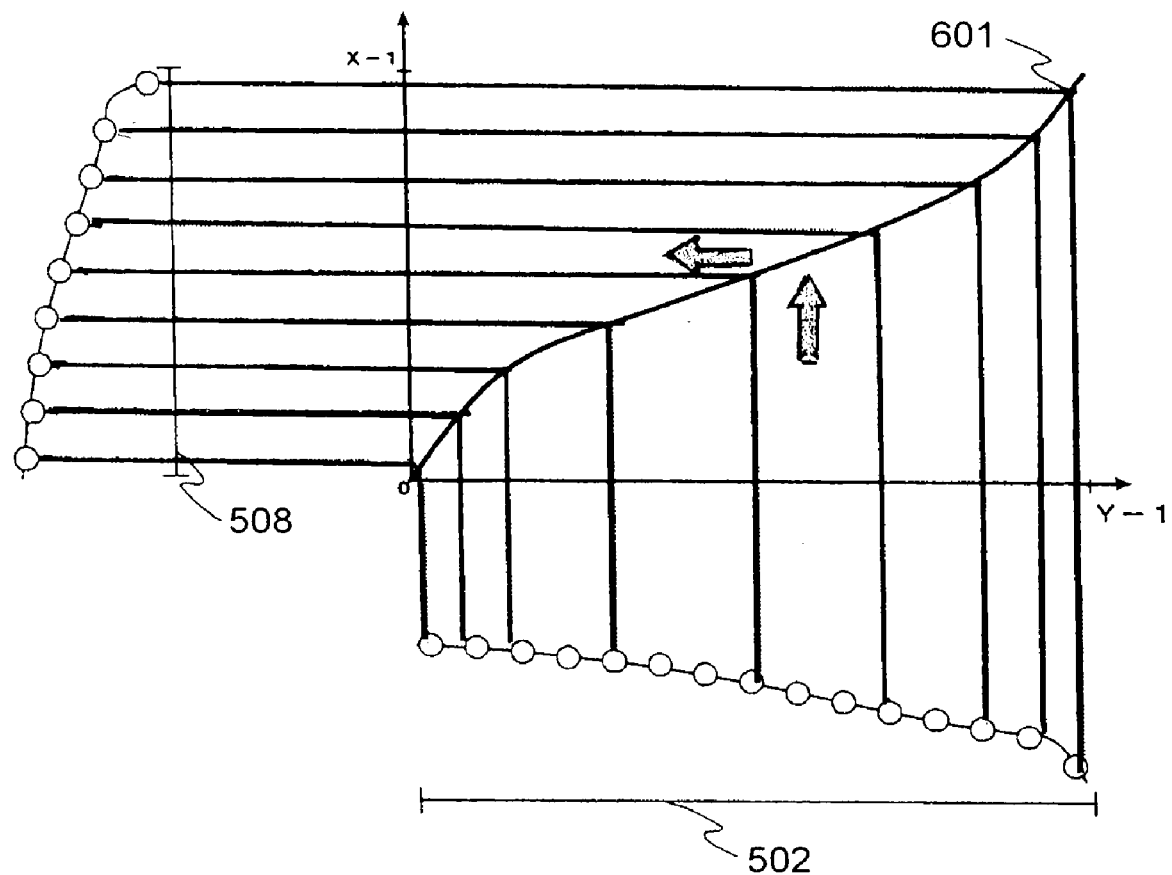
FIG. 6 is a schematic diagram of an exemplary mapping function for elastic ratio calculation.

A relationship (mapping function) between some point y in the model pattern and a corresponding position x in an elastic model pattern is represented by an equation (1) and FIG. 6. In FIG. 6, sign 502 represents the elastic section in the model pattern, sign 508 represents a section between a mora of succeeding accent nucleus and an end mora of accent phase, and sign 601 represents a mapping function.

$$x = (x-1)\{\gamma - w(\gamma - f(\gamma))\},$$

$$y = (Y-1)\{f(\gamma) - w(\gamma - f(\gamma))\}, (0 \leq w \leq 1)$$

$$f(\gamma) = \{g(\alpha) - g(-\alpha)\}^{-1} \cdot g(2\alpha\gamma - \alpha), (0 \leq w \leq 1)$$

$$g(u) = \{1 + \exp(-u)\}^{-1} \quad (1)$$

In the equation (1), α is used for limiting domain of a sigmoid function g, and a function is used for normalizing domain and range of the sigmoid function g to [0,1] respectively.

Furthermore, w may be set based on a ratio of a length of input phoneme duration to a model pattern. For example, "w" is "0.5" in case that the length of input phoneme duration is equal to the model pattern, "w" is a real number below "0.5" in case that the length of input phoneme duration is above the model pattern, and "w" is a real number above "0.5" in case that the length of input phoneme duration is below the model pattern. Furthermore, the functions f and g are not always necessary.

As to some point y(=b) in the model pattern 502 in FIG. 6, a value x calculated by a parameter variable γ is represented as x{yb}. In this case, an elastic ratio z{yb} of the point y(=b) is calculated by following equation (2).

$$Z\{yb\} = \lim_{h \to 0} [x\{yb+h\} - x\{yb\}]/h \quad (2)$$

In this way, the elastic ratio of the elastic section 502 in the model pattern 501 is calculated. In FIG. 5, in case that the phoneme is a mora, "a phoneme of accent nucleus" is called "a mora of accent nucleus", "a phoneme of succeeding accent nucleus" is called "a mora of succeeding accent nucleus", and "an end phoneme of accent phase" is called "an end mora of accent phase".

Above-mentioned model pattern is exemplary. A start point of the elastic section may be "a phoneme of accent nucleus", "a phoneme of succeeding accent nucleus", or "a phoneme of second succeeding accent nucleus". Furthermore, an end point of the elastic section may be "an end phoneme of prosodic control unit", "a phoneme of preceding end point of prosodic control unit", or "a phoneme of second preceding end point of prosodic control unit".

Next, the elastic section 4 expands or contracts the model pattern e using the elastic ratio of the elastic section (S4). The right side in FIG. 5 shows an exemplary elastic model pattern. In FIG. 5, sign 506 represents an exemplary elastic case (contraction), sign 507 represents an exemplary model pattern Φe contracted, and sign 508 represents the elastic section contracted.

As to each fundamental frequency pattern-child set (generated by the temporary child set generation unit 1), the typical pattern generation unit 5 generates a temporary typical pattern having the predetermined length by statistic processing using the model pattern (expanded or contracted) (S5).

In the first embodiment, a statistic value at each time series point of temporary typical patterns is an average value, and the statistic processing is averaging based on the model pattern as a bias. FIG. 5 shows an exemplary temporary typical pattern 512 generated. As a statistic value representing the temporary typical pattern, an average value of logarithm fundamental frequency at each time series point of fundamental frequency patterns is used, and one mora is normalized to represent by three points.

In FIG. 5, sign 407 represents the fundamental frequency pattern-child set among a plurality of fundamental frequency pattern-child sets classified with the context by the temporary child set generation unit 1. The fundamental frequency pattern-child set 407 includes three fundamental frequency patterns. Each fundamental frequency pattern corresponds an accent phase having a plurality of mora boundaries.

Sign 509 represents a normalized fundamental frequency pattern by elastic/parallel moving along fundamental frequency axis. As the normalization method along fundamental frequency axis, the fundamental frequency pattern is parallel-moved so that a start point of the fundamental frequency pattern coincides with a predetermined value.

Sign 510 represents a fundamental frequency pattern normalized along the time axis. As the normalization method along time axis, the fundamental frequency pattern is expanded or contracted so that each mora includes three points.

Sign 512 represents a temporary typical pattern in which feature of each time series point is represented by average value. As the averaging method 511 of feature at each time series point, values at the same time series point of three fundamental frequency patterns normalized are averaged using the model pattern expanded or contracted as a bias.

With regard to above method for generating the temporary typical pattern, the normalization (elastic) processing is represented by a function $f(\cdot)$, and a fundamental frequency pattern is represented by a vector $p_i$. A vector $r_i$ of normalized fundamental frequency pattern is represented by following equation (3).

$$r_i = f(p_i) = F_i p_i \qquad (3)$$

The normalization (elastic) processing is generalized by the equation (3) in which a matrix $F_i$ is multiplied with a vector $p_i$. In case of determining each element of the matrix $F_i$, a mapping function representing correspondence between a fundamental frequency pattern and a normalized fundamental frequency pattern is necessary. As the mapping function, a linear function, a sigmoid function, a multi-dimensional Gaussian function, or combination of these functions, is used.

Figures 7A, 7B:
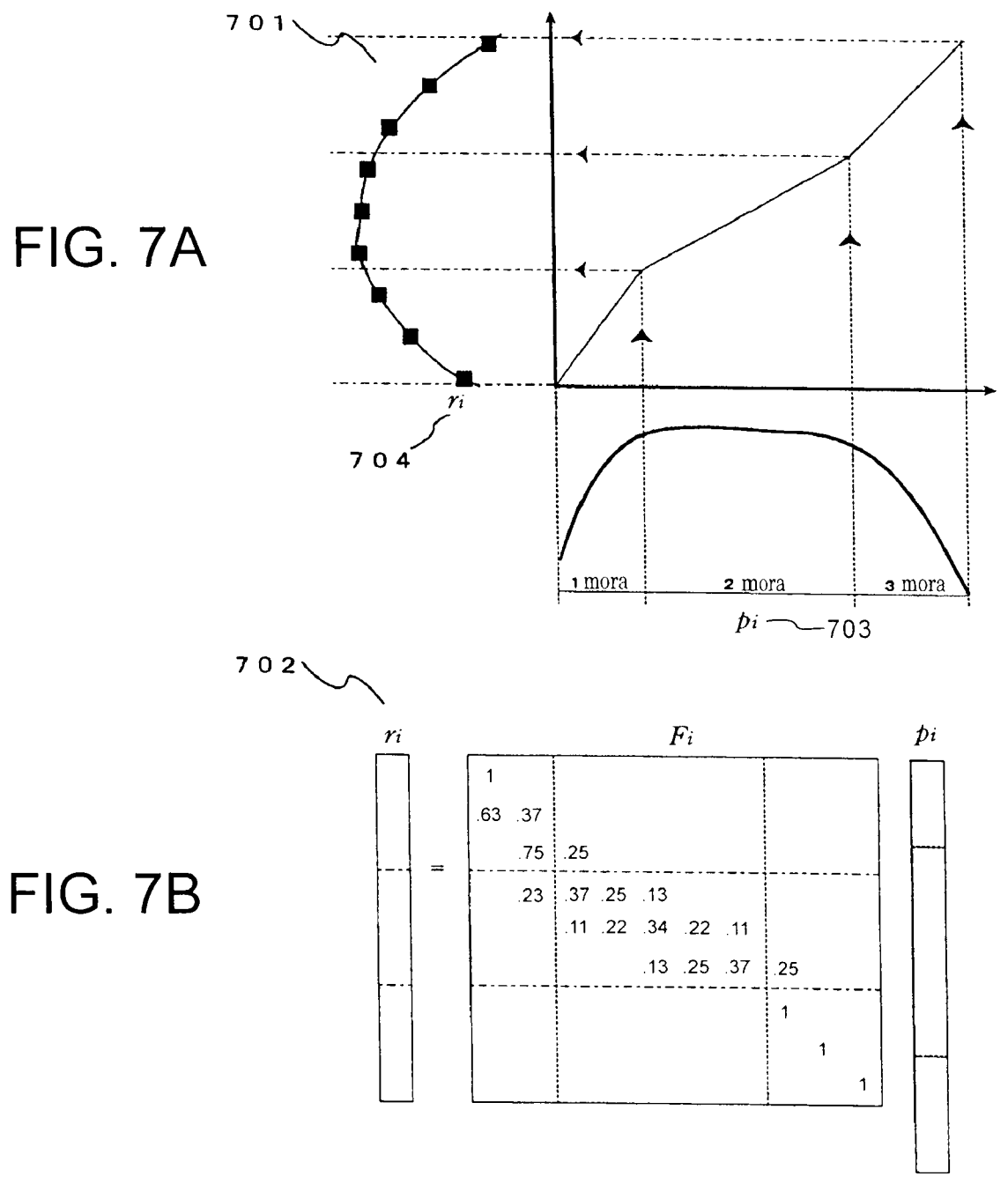

FIG. 7A shows an exemplary mapping function 701. In FIG. 7A, a horizontal direction represents a fundamental frequency pattern, and a vertical axis represents a normalized fundamental frequency pattern. The mapping function is a combination of linear functions. With regard to each region represented by mora boundary (dotted line), each mora of a fundamental frequency pattern is linearly mapped to each mora of the normalized fundamental frequency pattern.

Briefly, by corresponding each time series point of the fundamental frequency pattern with each time series point of the normalized fundamental frequency pattern, each element of the matrix $F_i$ is determined. In this case, the number of samples (duration) within each mora of the fundamental frequency pattern is necessary, which is generally included in a speech database and easily acquired.

FIG. 7B shows an exemplary matrix $F_i$ 702. As to the matrix $F_i$ in FIG. 7B, mapping of the first mora is expansion, mapping of the second mora is contraction, and mapping of the third mora is keeping/preserving. In this way, the fundamental frequency pattern $p_i$ is mapped onto the normalized fundamental frequency pattern $r_i$.

Furthermore, if the number of fundamental frequency patterns is N(=3), a temporal typical pattern "c" is represented by following equation (4).

$$C = \frac{1}{N}\sum_{i=1}^{N} r_i + \tau \Phi_e \qquad (4)$$

In the equation (4), a vector "Φe" represents a model pattern expanded or contracted, and "τ" is a hyper parameter to control bias degree of the model pattern. The hyper parameter can be adjusted by the number of fundamental frequency patterns, or can be experimentally calculated as a value representing a fundamental frequency pattern not used to generate the typical pattern.

After the temporary typical pattern of each temporary child set is generated, the child set decision unit 6 determines a child set based on a distortion between the temporary typical pattern and the fundamental frequency pattern of the temporary child set (S6). In the first embodiment, the distortion is a sum of squared error at each time series point of the temporary typical pattern and the fundamental frequency pattern.

As to the temporary child set (generated by the temporary child set generation unit 1), a temporary typical pattern is selected in correspondence with each fundamental frequency pattern belonging to the temporary child set. The temporary typical pattern is transformed to match the fundamental frequency pattern, and a synthesized fundamental frequency pattern is generated.

Correspondence between the fundamental frequency pattern and the temporary typical pattern means, for example, the fundamental frequency pattern is used for generating the temporary typical pattern. In FIG. 5, the fundamental frequency pattern 404 corresponds the temporary typical pattern 512.

Figure 8:
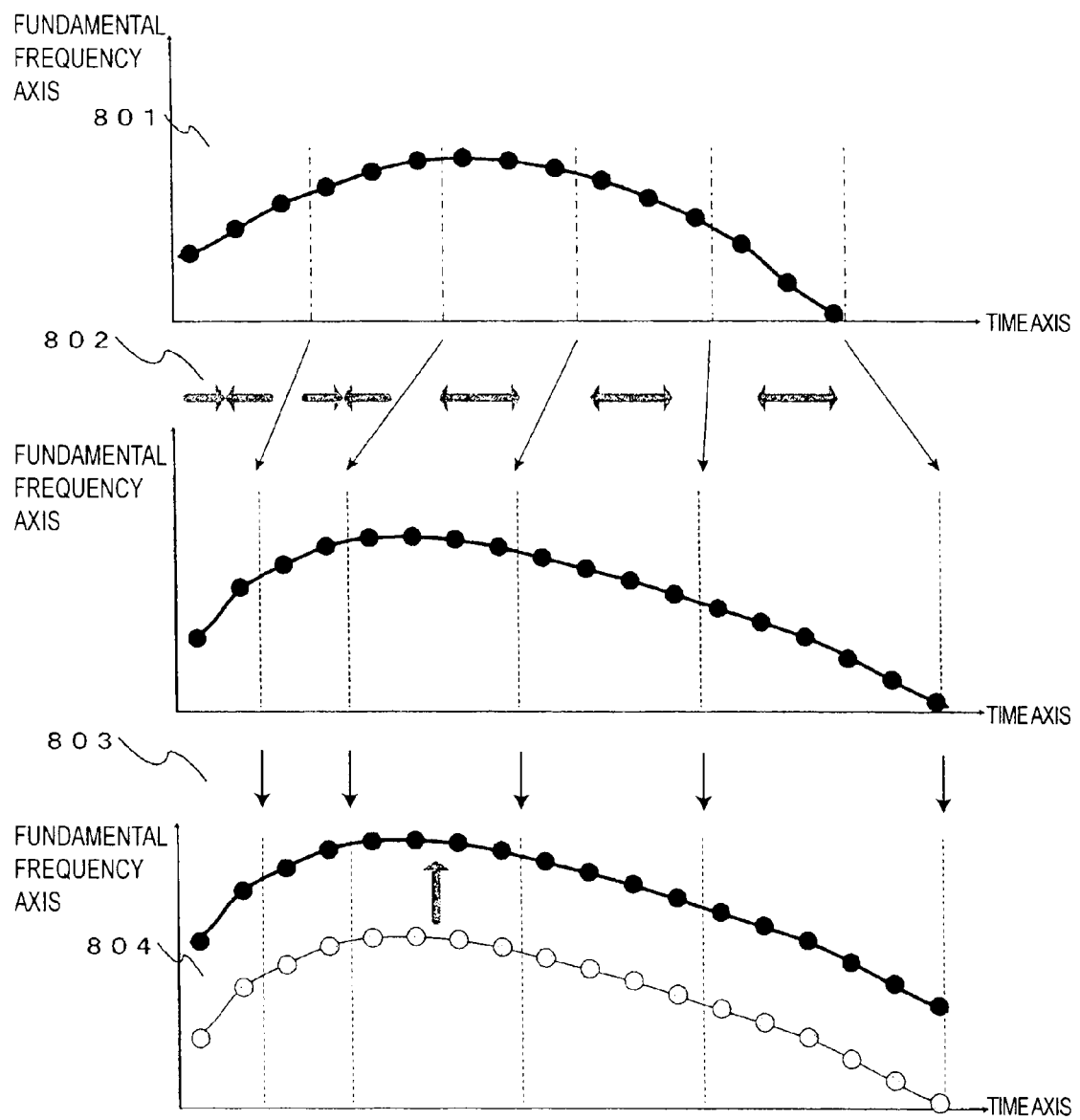
FIG. 8 is a schematic diagram of an exemplary transformation of the temporary typical pattern.
Figure 9:
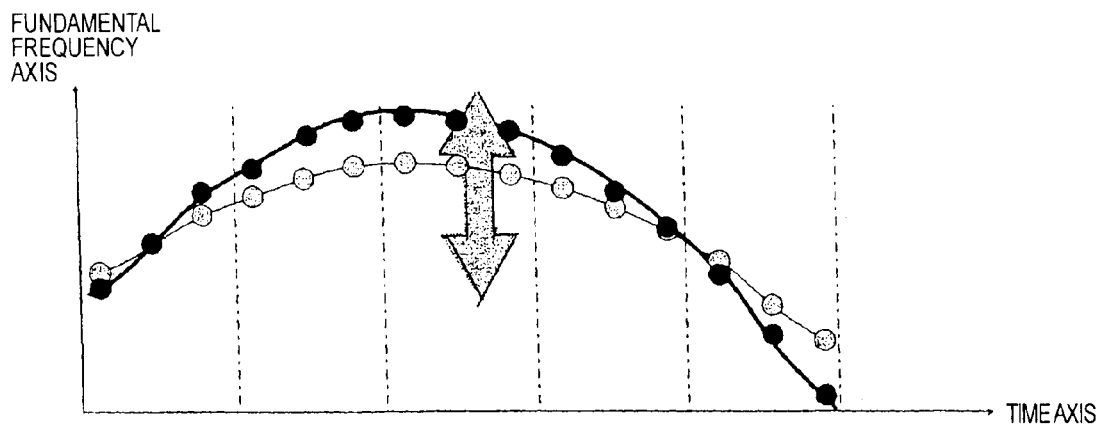
FIG. 9 is a schematic diagram of another exemplary transformation of the temporary typical pattern.

FIG. 8 is an exemplary transformation of the temporary typical pattern. In FIG. 8, sign 801 represents a temporary typical pattern selected in correspondence with the fundamental frequency pattern. Sign 802 represents elastic operation of the temporary typical pattern along the time axis. The elastic operation is executed so that a length of each mora of the temporary frequency pattern is respectively equal to a length of each mora (duration) of the fundamental frequency pattern.

Sign 803 represents a parallel moving of the temporary typical pattern along a fundamental frequency axis. The parallel moving is executed so that a sum of squared error at each time series point between the temporary frequency pattern and the fundamental frequency pattern is minimized. In this way, a synthesized fundamental frequency pattern 804 is generated by transforming the temporary typical pattern. However, above transformation is not always necessary.

Next, a temporary child set of fundamental frequency patterns classified by sub-classification rule is G, and some fundamental frequency pattern in the temporary child set G is a vector $P_i$. The temporary typical pattern vector c is transformed using the vector $p_i$ as a target (calculation of a function $h(\cdot)$). A synthesized (transformed) fundamental frequency pattern is a vector $\hat{p}_i$. A distortion E(G,c) between the synthesized fundamental frequency pattern and the fundamental frequency pattern (of the temporary child set) is represented by following equation (5).

$$E(G, c) = \sum_{p_i \in G} (p_i - \hat{p}_i)^T (p_i - \hat{p}_i) \tag{5}$$
$$= \sum_{p_i \in G} (p_i - h(c, p_i))^T (p_i - h(c, p_i))$$

Next, a set of fundamental frequency patterns in speech data 11 is $G_{all}$, fundamental frequency patter-child sets classified by sub-classification rule $x_k$ is "$G(x_k)=\{G^{(1)}, G^{(2)}, \ldots, G^{(m)}, \ldots\}$", and a temporary typical pattern corresponding to a fundamental frequency pattern-child set $G^{(m)}$ is $c^{(m)}$. In this case, a standard to classify is represented by following equation (6). A temporary child set $G(x_{best})$ acquired by the standard (classification rule) $x_{best}$ is determined as a child set.

$$X_{best} = \underset{x_k}{\mathrm{argmax}} \Delta E(x_k, G_{all}) \tag{6}$$
$$= \underset{x_k}{\mathrm{argmin}} \left( \sum_{G^{(m)} \in G(x_k)} E(G^{(m)}, c^{(m)}) \right)$$

Next, the pattern storage unit 13 stores a typical pattern as the temporary typical pattern corresponding to the child set, and the rule storage unit 14 stores a classification based on the context of the fundamental frequency pattern included in the child set (S7).

As mentioned-above, with regard to the typical pattern training apparatus of the first embodiment, in case of generating a temporary typical pattern from fundamental frequency patterns (hierarchically clustered by the context), by using a model pattern having an elastic section to match with a length of temporary typical pattern, the temporary typical pattern is statistically generated. Accordingly, reliability of the typical pattern (selected from temporary typical patterns) improves, and a fundamental frequency pattern having robustability and natural intonation can be generated from the typical pattern.

Hereinafter, exemplary modifications of the first embodiment are explained.

As a fundamental frequency pattern prepared in speech data, a series of fundamental frequencies or a series of logarithm fundamental frequencies (human's hearing characteristic for sensing loudness is taken into consideration) can be used.

If speech data having fundamental frequency pattern is small, a type-N accent pattern is used as the model pattern. The type-N accent pattern is acquired by averaging fundamental frequency patterns of type-N accent in another speech data having a large number of fundamental frequency patterns. If another speech data is not preserved, a typical pattern can be generated from experience and knowledge of phoneticians, and used.

In case of generating a temporary typical pattern of a child set (of fundamental frequency patterns) hierarchically clustered, the temporary typical pattern of a parent set may be used as the model pattern of the child set. If a size of the parent set is not sufficiently large (lacks reliability), the temporary typical pattern of an ancestor set (an upper layer set than the parent set) may be used as the model pattern of the child set.

A statistic value of time series point of the temporary typical pattern is calculated using the model pattern for time series point of the fundamental frequency pattern. The statistic value can be used as at least one of an average value, a distributed value, and a standard deviation value. If the standard deviation value is fixed or if the distribution value and the standard deviation value are not processed, the statistic value may be used as the average value or a value corresponding to the average value.

With regard to transformation of the temporary typical pattern for the fundamental frequency pattern as a target, elastic operation along a horizontal direction (a time axis) matched with a duration, elastic operation along a vertical axis (a frequency axis) matched with variation of a fundamental frequency (shown in FIG. 9), a moving operation along the frequency axis matched with offset along the vertical axis (frequency axis) or at least one of these combination, can be used.

For example, the fundamental frequency pattern as target is a vector $p_i$, the temporary typical pattern is a vector c, a matrix $D_i$ to be elastic, a moving value $b_i$ along the frequency axis, and an elastic value $g_i$ along the frequency axis. In this case, a function ($h(\cdot)$) to transform is represented by following equation (7).

$$h(c, D_i, b_i, g_i) = g_i \cdot D_i \cdot c + b_i \cdot 1 \tag{7}$$

In the equation (7), the vector "1" is a vector having all elements "1". Furthermore, "$D_i$, $b_i$, $g_i$" can be determined by solving a partial differential equation (=0) with each parameter. With regard to the matrix $D_i$ to be elastic along the time axis, in case of expanding or contracting the temporary typical pattern of accent phase, each element of the matrix is easily determined by setting a limit that a mora boundary is linearly elastic or elastic with fixed inclination to match with the fundamental frequency pattern of target.

In case that the fundamental frequency pattern of target is unknown, i.e., in case of transformation for speech synthesis, the temporary typical pattern is a vector c, a matrix $<D_i>$ to be elastic, a moving operation $<b_i>$ along frequency axis, and an elastic operation $<g_i>$ along frequency axis. In this case, a function ($h(\cdot)$) to transform is represented by following equation (8).

$$h(c, <D_i>, <b_i>, <g_i>) = <g_i><D_i>c + <b_i>1 \tag{8}$$

In the equation (8), "$<D_i>$, $<b_i>$, $<g_i>$" is respectively or combinatively generated from a model using a statistic method (quantification method type I), a recursive learning method, or known method (a multi-dimensional normal distribution, GMM).

A distortion between a temporary child set of fundamental frequency pattern and a temporary typical pattern may be calculated as a sum of squared error of each time series point. As to the sum of squared error, an importance degree of fundamental frequency pattern such as a hackneyed expression, or the number of fundamental frequency patterns included in the fundamental frequency pattern-child set, may be used.

In case of listening to synthesized speech, a speech part unnaturally heard affects on a listener's impression more than a speech part naturally heard. Accordingly, a maximum of the squared error at each time series point may be calculated.

With regard to a speech synthesis apparatus, stability that natural speech is output for various kinds of input context is necessary. Accordingly, a sum or a maximum of distribution value at each time series point may be calculated.

Furthermore, by adding the stability to an importance degree of fundamental frequency pattern such as a hackneyed expression or to the number of fundamental frequency patterns included in the fundamental frequency pattern-child set, a sum of weighted distribution values of each time series point may be calculated.

In general, distribution of each time series point is not uniform. Accordingly, by weighting with a distribution (standard deviation) of each time series point, a sum of logarithm likelihood of each time series point may be calculated. Furthermore, in the same way as the sum of squared error, a sum of weighted logarithm likelihood of each time series point may be calculated. Furthermore, in the same way as the maximum of squared error, a maximum of logarithm likelihood of each time series point may be calculated.

As to statistical processing using a model pattern as a previous knowledge, by expanding or contracting the model pattern represented by the equation (3) or (4), a temporary typical pattern may be generated by general averaging with the model pattern as a bias.

Furthermore, in general, distribution of each time series point is not uniform. Accordingly, by expanding or contracting a model pattern, a temporary typical pattern may be calculated by average and distribution (standard deviation) using the model pattern as a bias.

Furthermore, an equation having the distortion evaluation function with the model pattern as a bias may be optimally solved (maximized or minimized). For example, as to the distortion evaluation function (5), following equation (9) is partially differentiated by a vector "c" (temporary typical pattern). By solving a partial differentiated equation (=0), the temporary typical pattern is generated.

$$\phi(G,c,\Phi e) = E(G,c) + \tau(\Phi e - c)^T (\Phi e - c) \quad (9)$$

As to the equation (9), the vector "c" (temporary typical vector) is used, and fine temporary typical pattern is not generated by solving the equation only one time. Accordingly, whenever an initial value of a suitable vector "c" is set, a step to solve an equation having the distortion evaluation function need be repeated several times.

As the initial value of the vector "c", for example, a value having suitable characteristic may be prepared by a foresight knowledge. Furthermore, a sequence of noise or data may be used, or a vector "c" shown in the equation (3) or (4) may be used. As to a repeat condition of above-mentioned step, change of a distortion by the distortion evaluation function converges at some value, or the above-mentioned step is repeated a predetermined number of times.

Furthermore, if the distortion evaluation function is not a simple form, and if the equation (=0) partially differentiated by a vector "c" (temporary typical pattern) cannot be directly solved, a typical parameter as a quasi optimization may be generated using a gradient method.

The prosodic control unit is a unit to control a prosodic feature of speech corresponding to an input context, and relates to a capacity of a typical vector. As the prosodic control unit, for example, "a sentence", "a breath group", "an accent phrase", "a morpheme", "a word", "a mora", "a syllable", "a phoneme", "a half phoneme", "a unit divided from one phoneme by HMM", or "combination of above-mentioned units", are used.

As to the context, information (used for a regular speech synthesizer) affecting on intonation, for example, "accent type", "the number of moras", "type of phoneme", "existence of pose of accent phase boundary", "position of accent phase in sentence", "part of speech", "linguistic information of the prosodic control unit (succeeding, proceeding, second succeeding, second proceeding)", or "at least one value of predetermined attributes", may be used.

As the predetermined attributes, for example, "prominence information affecting on change of accent loudness", "information such as intonation and utterance style affecting on change of fundamental frequency pattern in all utterance", "intention information such as a query, a decision, an emphasis", or "mental attitude information such as a suspicious, an interest, a discouragement, an admiration", are applied.

As a phoneme, according to circumstances to package the apparatus, "a mora", "a syllable", "a phoneme", "a half phoneme", or "a unit divided from one phoneme by HMM", may be flexibly used.

Figure 10:
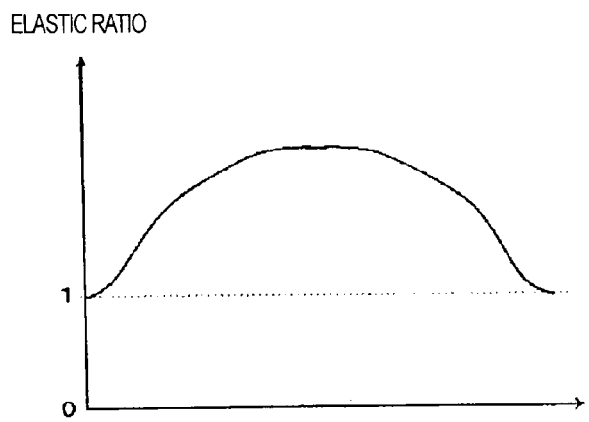
FIG. 10 is a second exemplary elastic ratio.
Figure 11:
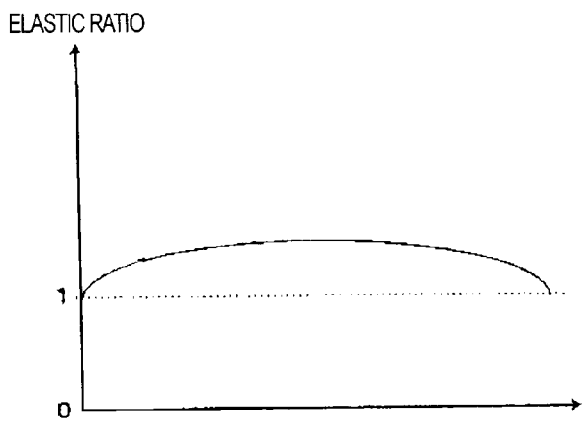
FIG. 11 is a third exemplary elastic ratio.
Figure 12:
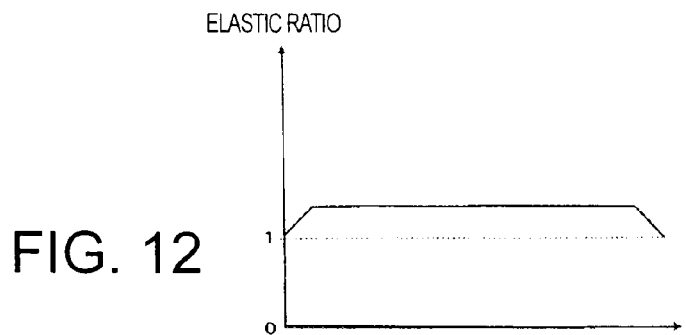
FIG. 12 is a fourth exemplary elastic ratio.

With regard to the calculation unit 3, as shown in FIG. 10, a center part of the elastic section may be more expanded more than another part of the elastic section by "w" in the equation (1) as a small value. Furthermore, as shown in FIG. 11, combination of an ellipse and a parabola may be used. Furthermore, as shown in FIG. 12, a part except for both edges in the elastic section may be expanded with a predetermined ratio.

Figure 13:
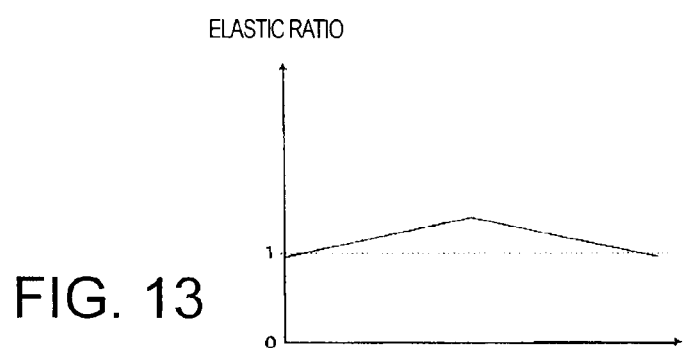
FIG. 13 is a fifth exemplary elastic ratio.
Figure 14:
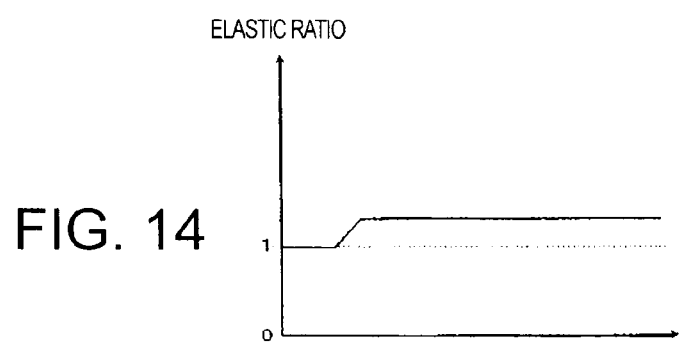
FIG. 14 is a sixth exemplary elastic ratio.
Figure 15:
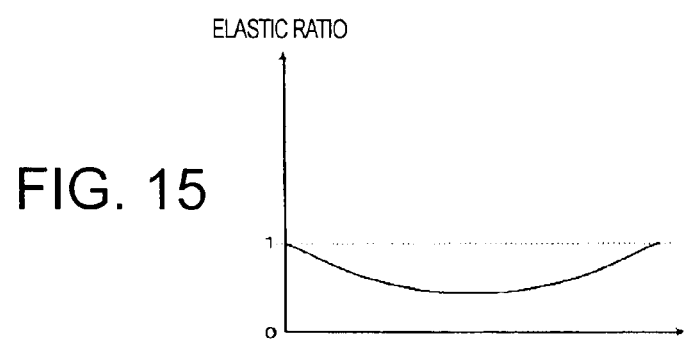
FIG. 15 is a seventh exemplary elastic ratio.

Furthermore, as shown in FIG. 13, the elastic ratio may be constantly increased/decreased toward a center of the elastic section. Furthermore, as shown in FIG. 14, the elastic ratio may be constant except for a beginning part of the elastic section. Furthermore, as shown in FIG. 15, all the elastic section may be contracted.

Furthermore, a likelihood curve, a tractrix curve, a catenary curve, a cycloid, a trochoid, an Agnesi's curve, a clothoid curve, or combination of these curves and FIGS. 10~15, may be used to calculate the elastic ratio. Furthermore, instead of the elastic ratio of the elastic section, an elastic quantity may be calculated.

The Second Embodiment

Figure 16:
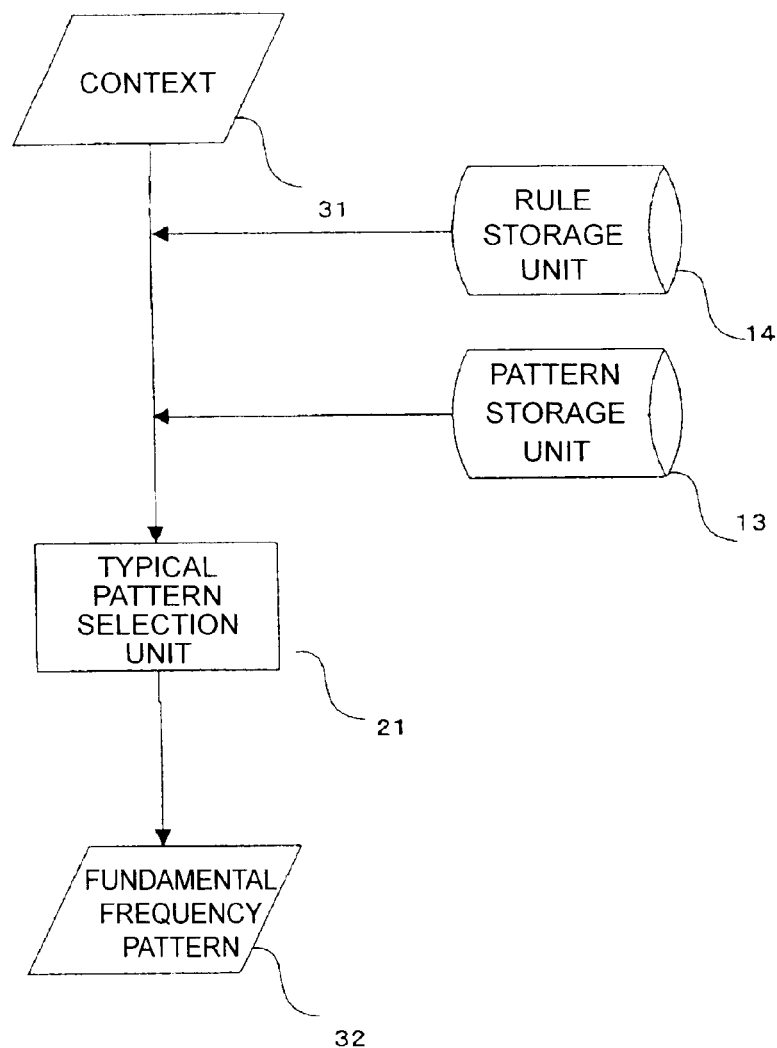
FIG. 16 is a block diagram of a typical pattern output apparatus according to a second embodiment.
Figure 17:
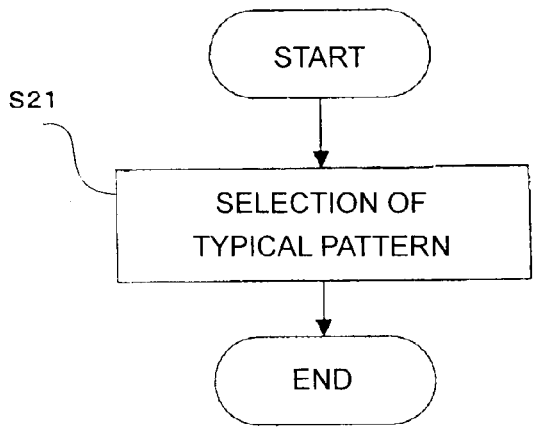
FIG. 17 is a flow chart of processing of the typical pattern output apparatus in FIG. 16.
Figure 18:
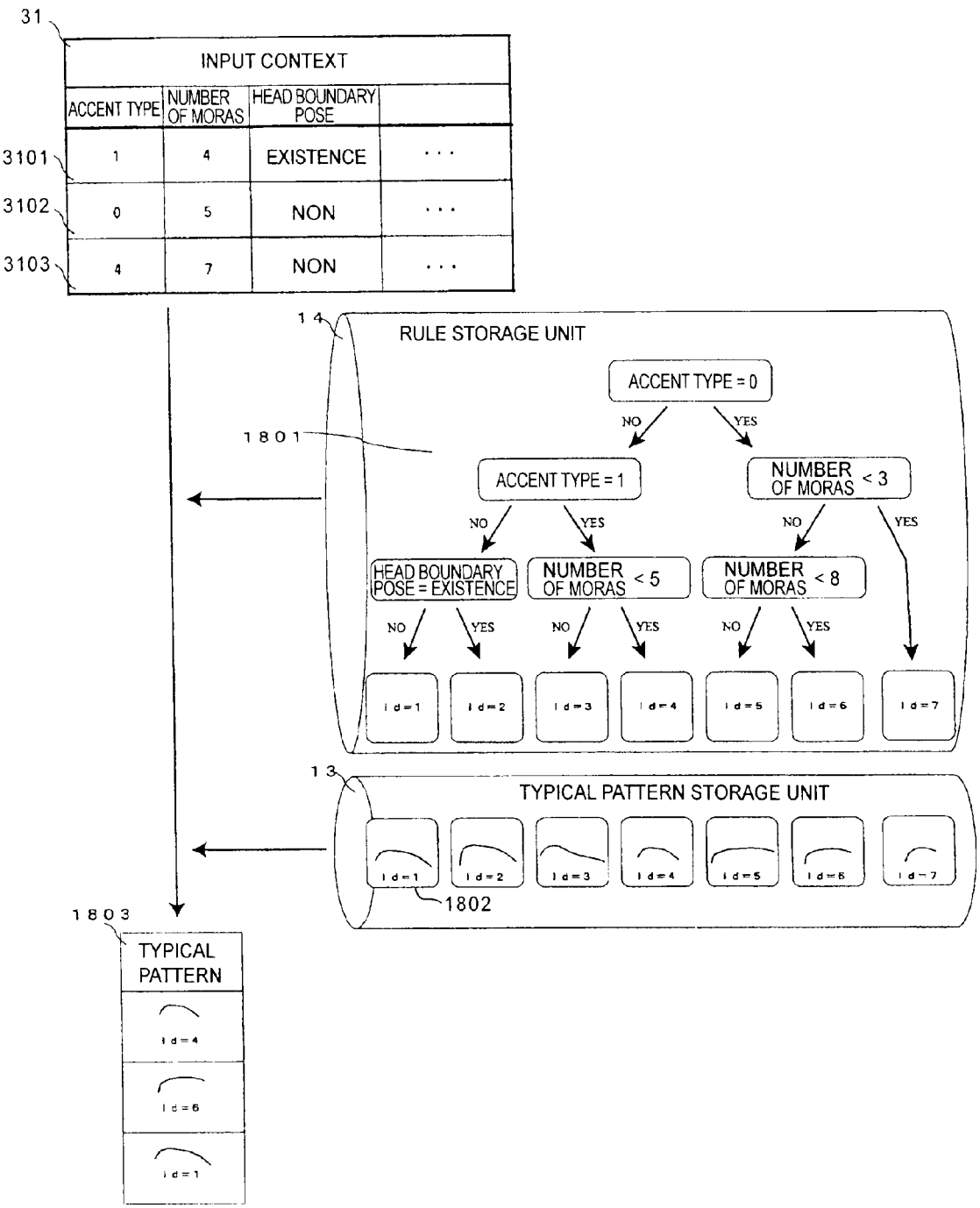
FIG. 18 is a schematic diagram of operation of a typical pattern selection unit in FIG. 16.

Next, a typical pattern output apparatus of the second embodiment is explained by referring to FIGS. 16~18.

FIG. 16 is a block diagram of the typical pattern output apparatus of the second embodiment. As shown in FIG. 16, the typical pattern output apparatus includes a pattern storage unit 13, a rule storage unit 14, and a typical pattern selection unit 21. The pattern storage unit 13 stores a plurality of typical patterns each corresponding to a prosodic control unit (an accent phase). The rule storage unit 14 stores a classification rule to select a typical pattern based on an input context 31.

The typical pattern selection unit 21 selects the typical pattern corresponding to the input context 31 from typical patterns stored in the pattern storage unit 13 by applying the classification rule to the input context 31.

Next, processing of the typical pattern output apparatus is explained by referring FIGS. 16~18. FIG. 17 is a flow chart of processing of the typical pattern output apparatus 17. FIG. 18 is a schematic diagram that an exemplary input context, an exemplary classification rule, and an exemplary typical pattern selected by applying the classification rule to the input context. In the second embodiment, the prosodic control unit is explained as the accent phase. However, the prosodic control unit is not limited to this.

The typical pattern selection unit 21 selects a typical pattern by applying the classification rule to the input context (S21). The input context 31 is comprised of sub-context of accent phase. In FIG. 18, three sub-contexts are shown. In case of the prosodic control unit as the accent phase, for example, each context (sub-context) includes all or a part of an accent type, the number of moras, an existence (or not) of a head boundary pose, a part of speech, a modified phase, an existence (or not) of emphasis, an accent type of a preceding accent phase. Each context (sub-context) can further include other information. In FIG. 18, information related with the classification rule 14 is explicitly shown.

The classification rule 1801 is, for example, a rule to classify typical patterns as a decision tree (recursive tree). In the decision tree, a joint node (non-leaf node) is connected to "a classification rule related with context" called "a query". Furthermore, each leaf node is connected to an identifier (id) of the typical pattern. In this case, each leaf node may directly refer to the typical pattern. Accordingly, the identifier is not always necessary.

With regard to the classification rule related with context, for example, whether "an accent type=0", whether "an accent type<2", whether "the number of moras=3", whether "a head boundary pose exists", whether "a part of speech=noun", whether "a modified part<2", whether "an emphasis exists", whether "a preceding accent type=0", or whether "a preceding accent type=0 and an accent type=1", can be used.

In case of applying the classification rule to the input context, decision whether the sub-context coincides with the query is repeatedly executed from a root node to a leaf node of the decision tree. Then, a typical pattern 1802 corresponding to the leaf node is selected.

For example, as shown in selected typical pattern 1803 of FIG. 18, by applying the classification rule to the first sub-context 3101, a typical pattern "id=4" is selected. By applying the classification rule to the second sub-context 3102, a typical pattern "id=6" is selected. By applying the classification rule to the third sub-context 3103, a typical pattern "id=1" is selected. In this way, the typical pattern as a fundamental frequency pattern normalized along the time axis and the frequency axis is output.

In the second embodiment that the typical pattern is used for speech synthesis, each typical pattern 1803 (selected) is transformed to generate a fundamental frequency pattern (synthesized speech parameter). For example, as explained in the first embodiment, sub-parameter (a matrix <D> to be elastic along the time axis, a value <b> to move along the frequency direction, a value <g> to be elastic along the frequency direction) for transformation is necessary.

These sub-parameters are suitably input from the outside in the same way as the context 31. For example, these parameters are generated from a model using a statistic method (quantification method type I), a recursive learning method, or known method (a multi-dimensional normal distribution, GMM) with the input context 31.

As mentioned-above, with regard to the typical pattern output apparatus of the second embodiment, in case of generating a typical pattern from fundamental frequency patterns (hierarchically clustered by the context), by using a model pattern having an elastic section to match with a length of a temporary typical pattern, the typical pattern and a classification rule are statistically generated. By using the typical pattern and the classification rule, a typical pattern corresponding to the input context is selected. Accordingly, the typical pattern having high reliability can be selected, and a fundamental frequency pattern (synthesized speech parameter) having robustability and natural intonation can be generated.

In the embodiments, the processing can be accomplished by a computer program, and the computer program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and soon. In short, the equipment and the apparatus that can execute the functions in embodiments using the program are generally called the computer.

Other embodiments of the invention will be apparent to those skilled in the art from consideration of the specification and practice of the embodiments of the invention disclosed herein. It is intended that the specification and examples be considered as exemplary only, with the scope and spirit of the invention being indicated by the following claims.

What is claimed is:

1. An apparatus for processing speech information, comprising:
    a first generation unit configured to generate a temporary child set to which at least one fundamental frequency pattern belongs by classifying a plurality of fundamental frequency patterns of inputted speech data based on a classification item of a context of the inputted speech data;
    a first decision unit configured to decide a length of a temporary typical pattern of the temporary child set;
    a model pattern setting unit configured to set a model pattern having an elastic section along a temporal direction;
    a calculation unit configured to calculate an elastic ratio of the elastic section so that the length of the temporal typical pattern coincides with a length of the model pattern;
    an elastic unit configured to expand or contract the elastic section of the model pattern based on the elastic ratio;
    a second generation unit configured to generate the temporary typical pattern of the temporary child set by combining the fundamental frequency pattern belonging to the temporary child set with the model pattern having an elastic pattern expanded or contracted;

a second decision unit configured to calculate a distortion between the temporary typical pattern of the temporary child set and the fundamental frequency pattern belonging to the temporary child set, and to decide a child set as the temporary child set when the distortion is below a threshold;

a pattern storage unit configured to store a typical pattern as the temporary typical pattern of the child set; and a rule storage unit configured to store a classification rule of the typical pattern as the classification item of the context of the fundamental frequency pattern belonging to the child set.

2. The apparatus according to claim 1, wherein
the model pattern setting unit sets the model pattern using a fundamental frequency pattern of a parent set or an ancestor set of the temporary child set.

3. The apparatus according to claim 1, wherein
the calculation unit calculates a series of elastic ratios by monotonously increasing the elastic section after monotonously decreasing or by monotonously decreasing the elastic section after monotonously increasing.

4. The apparatus according to claim 1, wherein
a start point of the elastic section is a phoneme of accent nucleus, a phoneme of succeeding accent nucleus, or a phoneme of second succeeding accent nucleus, and
an end point of the elastic section is a phoneme of end point of a prosodic control unit, a phoneme of preceding end point of the prosodic control unit, or a phoneme of second preceding end point of the prosodic control unit.

5. The apparatus according to claim 1, further comprising
a selection unit configured to select the typical pattern having the classification rule matched with a content of each prosodic control unit inputted.

6. The apparatus according to claim 1, wherein
the second generation unit generates the temporary typical pattern by calculating at least one of an average value, a variance value, and a standard deviation value at each time series point of the fundamental frequency patterns belonging to the temporary child set.

7. The apparatus according to claim 1, wherein
the second generation unit generates the temporary typical pattern by
(1) averaging the fundamental frequency patterns based on the model pattern as a bias,
(2) calculating a variance value of the fundamental frequency patterns based on the model pattern as a bias,
(3) maximizing or a minimizing the distortion of the fundamental frequency patterns based on the model pattern as a bias, or
(4) quasi-maximizing the distortion of the fundamental frequency patterns based on the model pattern as a bias.

8. The apparatus according to claim 1, wherein
the second decision unit calculates the distortion as
(1) a sum of squared error value at each time series point of the fundamental frequency pattern and the temporary typical pattern,
(2) a sum of weighted squared error value at each time series point of the fundamental frequency pattern and the temporary typical pattern,
(3) a maximum of squared error value at each time series point of the fundamental frequency pattern and the temporary typical pattern,
(4) a sum of variance value at each time series point of the fundamental frequency pattern and the temporary typical pattern,
(5) a sum of weighted variance value at each time series point of the fundamental frequency pattern and the temporary typical pattern,
(6) a maximum of variance value at each time series point of the fundamental frequency pattern and the temporary typical pattern,
(7) a sum of logarithm likelihood at each time series point of the fundamental frequency pattern and the temporary typical pattern,
(8) a sum of weighted logarithm likelihood at each time series point of the fundamental frequency pattern and the temporary typical pattern, or
(9) a maximum of logarithm likelihood at each time series point of the fundamental frequency pattern and the temporary typical pattern.

9. The apparatus according to claim 1, further comprising
a prosodic control unit using at least one of a sentence, a breath group, an accent phrase, a morpheme, a word, a mora, a syllable, a phoneme, a half-mora, and a unit divided from one phoneme by HMM.

10. The apparatus according to claim 1, wherein
the classification item of the context is at least one of linguistic information of a prosodic control unit by analyzing a text, and an arbitrary attribute.

11. The apparatus according to claim 10, wherein
the attribute is at least one of prominence information, utterance style information, intension information of a query, a conclusion or a emphasis, and mental attitude information of a suspicion, an interest, a discouragement or an admiration.

12. The apparatus according to claim 4, wherein
the phoneme is at least one of a mora, a syllable, a phoneme, a half-mora, and a unit divided from one phoneme by HMM.

13. A method for processing speech information, comprising:

generating a temporary child set to which at least one fundamental frequency pattern belongs by classifying a plurality of fundamental frequency patterns of inputted speech data based on a classification item of a context of the inputted speech data;

deciding a length of a temporary typical pattern of the temporary child set;

setting a model pattern having an elastic section along a temporal direction;

calculating an elastic ratio of the elastic section so that the length of the temporal typical pattern coincides with a length of the model pattern;

expanding or contracting the elastic section of the model pattern based on the elastic ratio;

generating the temporary typical pattern of the temporary child set by combining the fundamental frequency pattern belonging to the temporary child set with the model pattern having an elastic pattern expanded or contracted;

calculating a distortion between the temporary typical pattern of the temporary child set and the fundamental frequency pattern belonging to the temporary child set;

deciding a child set as the temporary child set when the distortion is below a threshold;

storing a typical pattern as the temporary typical pattern of the child set; and storing a classification rule of the typical pattern as the classification item of the context of the fundamental frequency pattern belonging to the child set.

14. A non-transitory computer readable medium that stores computer executable instructions for causing a computer to perform a method for processing speech information, the method comprising:

generating a temporary child set to which at least one fundamental frequency pattern belongs by classifying a plurality of fundamental frequency patterns of inputted speech data based on a classification item of a context of the inputted speech data;

deciding a length of a temporary typical pattern of the temporary child set;

setting a model pattern having an elastic section along a temporal direction;

calculating an elastic ratio of the elastic section so that the length of the temporal typical pattern coincides with a length of the model pattern;

expanding or contracting the elastic section of the model pattern based on the elastic ratio;

generating the temporary typical pattern of the temporary child set by combining the fundamental frequency pattern belonging to the temporary child set with the model pattern having an elastic pattern expanded or contracted;

calculating a distortion between the temporary typical pattern of the temporary child set and the fundamental frequency pattern belonging to the temporary child set;

deciding a child set as the temporary child set when the distortion is below a threshold;

storing a typical pattern as the temporary typical pattern of the child set; and storing a classification rule of the typical pattern as the classification item of the context of the fundamental frequency pattern belonging to the child set.

* * * * *